(12) United States Patent
Choo et al.

(10) Patent No.: US 11,936,961 B2
(45) Date of Patent: Mar. 19, 2024

(54) SYSTEM AND METHOD OF PROVIDING ADVERTISEMENT THROUGH STREAMING VIDEO

(71) Applicant: TOOTHLIFE CO., LTD., Gyeonggi-do (KR)

(72) Inventors: Yun Sung Choo, Gyeonggi-do (KR); Won Pyo Hong, Gyeonggi-do (KR); Joo Won Kim, Gyeonggi-do (KR)

(73) Assignee: TOOTHLIFE CO., LTD., Gyeonggi-do (KR)

( * ) Notice: Subject to any disclaimer, the term of this patent is extended or adjusted under 35 U.S.C. 154(b) by 0 days.

(21) Appl. No.: 17/940,272

(22) Filed: Sep. 8, 2022

(65) Prior Publication Data
US 2023/0224551 A1    Jul. 13, 2023

(30) Foreign Application Priority Data

Jan. 12, 2022 (KR) .................. 10-2022-0004776
Feb. 25, 2022 (KR) .................. 10-2022-0025423

(51) Int. Cl.
*H04N 21/81* (2011.01)
*H04N 21/2187* (2011.01)
*H04N 21/235* (2011.01)

(52) U.S. Cl.
CPC ....... *H04N 21/812* (2013.01); *H04N 21/2187* (2013.01); *H04N 21/235* (2013.01)

(58) Field of Classification Search
CPC . H04N 21/812; H04N 21/2187; H04N 21/235
See application file for complete search history.

(56) References Cited

U.S. PATENT DOCUMENTS 5,530,469 A * 6/1996 Garfinkle ........... H04N 7/17318
                                                    348/E7.071
9,380,353 B1 * 6/2016 Ruxton ............ H04N 21/25891
(Continued)

FOREIGN PATENT DOCUMENTS

JP    2002366834 A    12/2002
JP    2019036946 A     3/2019
(Continued)

OTHER PUBLICATIONS

Notification of Reason for Refusal dated May 16, 2022 and English translation thereof for KR Application No. 10-2022-0025423.
(Continued)

*Primary Examiner* — Timothy R Newlin
(74) *Attorney, Agent, or Firm* — TAROLLI, SUNDHEIM, COVELL & TUMMINO L.L.P.

(57) ABSTRACT

A system and method of providing an advertisement through a streaming video is proposed. In the system of providing the advertisement through the streaming video, when advertisers registers advertisements on a streaming server, a streamer may select any one of the registered advertisements, and when the streamer activates an advertisement function, a real-time broadcast video of the streamer may be converted into an advertisement video of the advertisement selected by the streamer. A streamer selects any one of the advertisements registered by the advertisers, and provides advertising content to viewers by including an advertising content provision object, such as an advertising product information link, in a streaming video transmitted by the streamer. In an embodiment, the advertiser may perform advertiser and advertisement registration in an advertisement server, and may limit conditions, such as streamer's broadcast content to be advertised, the number of followers, and the number of viewers.

3 Claims, 5 Drawing Sheets

(56) References Cited

U.S. PATENT DOCUMENTS

| | | | |
|---|---|---|---|
| 10,643,221 B1* | 5/2020 | Price | G06Q 30/02 |
| 2002/0107832 A1* | 8/2002 | Shimizu | H04N 21/2543 |
| | | | 348/E7.071 |
| 2005/0086695 A1* | 4/2005 | Keele | H04H 60/06 |
| | | | 725/74 |
| 2008/0140502 A1* | 6/2008 | Birnholz | G06Q 30/0601 |
| | | | 705/26.1 |
| 2015/0326945 A1* | 11/2015 | Johnson | H04N 21/472 |
| | | | 725/32 |
| 2018/0255336 A1* | 9/2018 | Tallamy | H04N 21/23418 |
| 2019/0141410 A1* | 5/2019 | Zverina | H04N 21/23418 |
| 2019/0238937 A1* | 8/2019 | Lo | H04N 21/44213 |
| 2020/0065853 A1* | 2/2020 | Cvinar | H04N 21/2743 |
| 2020/0228880 A1* | 7/2020 | Lyer | H04N 21/23424 |
| 2022/0036328 A1* | 2/2022 | Kaye | G07G 1/0018 |
| 2022/0198551 A1* | 6/2022 | Song | G06Q 30/0643 |
| 2022/0312059 A1* | 9/2022 | Laul | H04N 21/858 |

FOREIGN PATENT DOCUMENTS

| | | |
|---|---|---|
| KR | 10-1383904 | 4/2014 |
| KR | 10-2015-0122296 A | 11/2015 |
| KR | 10-2018-0092873 A | 8/2018 |
| KR | 10-2005112 | 7/2019 |
| KR | 10-2021-0006748 A | 1/2021 |
| KR | 10-2021-0048101 A | 5/2021 |

OTHER PUBLICATIONS

Japanese Office Action for corresponding Japanese Application Serial No. 2022-139431, dated Jul. 5, 2023, pp. 1-12.

* cited by examiner

SYSTEM AND METHOD OF PROVIDING ADVERTISEMENT THROUGH STREAMING VIDEO

CROSS REFERENCE TO RELATED APPLICATION

This application is based on and claims priority from Korean Patent Applications Nos. 10-2022-0004776 filed on Jan. 12, 2022 and 10-2022-0025423 filed on Feb. 25, 2022 in the Korean Intellectual Property Office, the disclosure of which is incorporated herein in its entirety by reference.

BACKGROUND OF THE INVENTION

Field of the Invention

The present disclosure relates to a system and method of providing an advertisement and, more particularly, to a system and method of providing an advertisement through a streaming video transmitted by a streamer and a streaming platform.

Description of the Related Art

Unless otherwise indicated in the present disclosure, the content described in this section is not related art to the claims of this application and is not admitted to be the related art by inclusion in this section.

Figure 1:
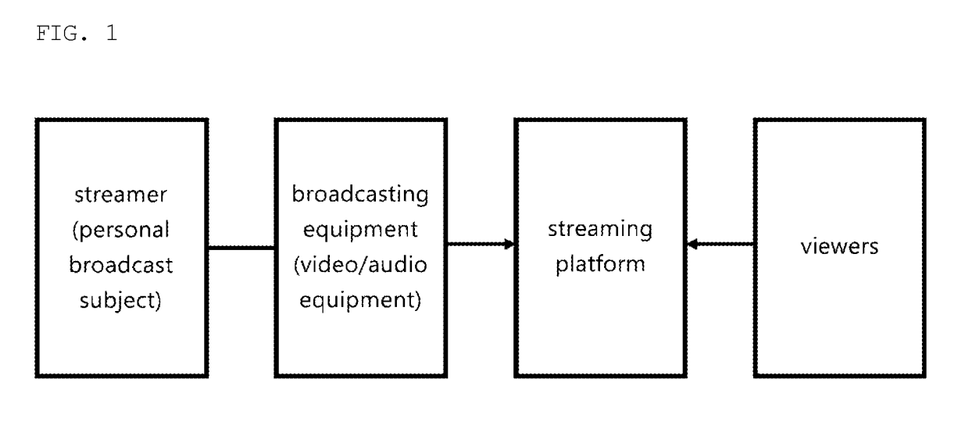
FIG. 1 is a view illustrating a configuration of a conventional streaming platform.

The number of streamers who conduct personal broadcasts using domestic and foreign streaming platforms such as YouTube, Afreeca, and Twitch is increasing, and the number of viewers watching the personal broadcasts is also increasing. As shown in FIG. 1, a conventional streaming platform provides a one-way service in which a subject who conducts a broadcast transmits broadcast videos in real time by using an input device such as a camera or a microphone, and viewers unilaterally receive and watch the broadcast videos.

A conventional streamer obtains profits for donations through a real-time broadcast video, or obtains profits by proceeding with an advertisement in response to a request of an advertiser. In this case, there is a problem that an advertisement is proceeded with an affiliated Multi Channel Network (MCN) regardless of an intention of a streamer during the advertisement, or the streamer is unable to proceed with an advertisement even though he or she desires to earn profits through the advertisement because the streamer has no associated advertiser. In addition, the advertiser also has a problem that a unit price of an advertisement is determined in an ambiguous manner, and it is difficult for the advertiser to connect with streamers he or she desires to work with.

DOCUMENTS OF RELATED ART

Patent Documents (Patent Document 1) Korean Patent No. 10-2005112 (registered on Jul. 23, 2019)
(Patent Document 2) Korean Patent No. 10-1383904 (registered on Apr. 3, 2014)

SUMMARY OF THE INVENTION

In a system of providing an advertisement through a streaming video according to an exemplary embodiment, when advertisers register advertisements on a streaming server, a streamer selects any one of the registered advertisements, and when the streamer activates an advertisement function, a real-time broadcast video of the streamer may be converted into an advertisement video of the advertisement selected by the streamer.

A streamer selects any one of advertisements registered by advertisers, and includes an advertising content provision object, such as an advertising product information link, in a streaming video transmitted by the streamer, so that advertising content is provided to viewers.

In the exemplary embodiment, an advertiser may perform advertiser and advertisement registration in an advertisement server according to the exemplary embodiment, and may limit conditions such as streamer's broadcast content to be advertised, the number of followers, the number of viewers, etc.

In the exemplary embodiment, in an advertisement pool registered by advertisers, a streamer confirms advertising content and advertisement unit price, and selects the advertising content desired to be advertised. Thereafter, an advertisement may be exposed on an integrated widget of a streamer broadcast, and the streamer may control advertisement playback through a control program during the broadcast.

In addition, in the exemplary embodiment, a streamer provides functions of favorites, wish lists, or the like on an advertising content provision object inserted into a video, and enables viewers to purchase an advertising product. In the exemplary embodiment, in a case where the number of purchases of the advertising product increases, an object may be displayed by enlarging a size of the object or by highlighting an outline of the object when the advertising content provision object is displayed on a streaming screen. In addition, in the exemplary embodiment, a highlight line thickness and a color of the advertising content provision object may be set to be more emphasized in proportion to the number of purchases of the product, sale amounts of the product, etc.

A system of providing an advertisement through a streaming video according to the exemplary embodiment includes: an advertiser terminal configured to register advertising content in an advertisement pool, and set streamer conditions for a streamer to advertise the advertising content; a streamer terminal configured to select the advertising content desired to be advertised from the registered advertisement pool, generate streaming content, and transmit the streaming content to a streaming server; and the streaming server configured to match the advertising content with the streamer by comparing the set streamer conditions and streamer information on the streamer who has selected the advertisement, and include the advertising content matched with the streamer in a streamer's broadcast video, so as to be output.

In the exemplary embodiment, the streaming server may be configured to include: an advertisement information collection module configured to collect the advertising content registered by an advertiser, the streamer conditions set in the advertising content, and the streamer information; a matching determination module configured to determine whether the streamer to proceed with the advertisement of the advertising content matches or not by comparing the streamer conditions set in the selected advertising content and the streamer information when the streamer selects the advertising content desired to be advertised; an advertisement widget generation module configured to generate an advertisement widget that is an advertising content provision object linked to an advertising product information link output to the streaming video; a commission calculation module configured to determine traffic due to accessing the advertising content through the advertisement widget output to the broadcast video, the number of sales and sales amount of the advertising product sold through the advertising content, so that advertisement performance obtained through the streamer matched with the advertising content is determined and additional commission according to the determined advertisement performance is calculated; and an advertisement conversion module configured to convert the real-time broadcast video of the streamer into an advertisement video of the advertisement selected by the streamer when an advertisement function is activated by the streamer terminal.

Through the system and method of providing the advertisement through the streaming video as described above, the streamer may generate the profits through the advertisement by selecting the advertising content he or she desires to advertise, and the advertiser may provide the advertising content through the streamer suitable for the advertising content, whereby an advertisement effect may be improved.

In addition, the streamer may select any one of the advertisements registered by the advertisers, so as to proceed with the advertisement, thereby creating effects that advertisement profits may be earned, advertisement concentration may be improved in a forced advertising form during a broadcast, and by using a method of voluntary advertisement selection and playback, the broadcast may not be interfered with by the advertisement.

In addition, an additional advertising cost is calculated according to advertisement performance of the streamer, whereby the profits of the streamer may be increased and the advertisement effect may be maximally increased.

The effects of the present disclosure are not limited to the above effects, and should be understood to include all effects that can be inferred from the detailed description of the present disclosure or the configuration of the present disclosure described in the claims.

DETAILED DESCRIPTION OF THE INVENTION

Advantages and features of the present disclosure and the methods of achieving the same will become apparent with reference to exemplary embodiments described below in detail in conjunction with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

In the following descriptions of the exemplary embodiments of the present disclosure, it is to be noted that, when a detailed description of a known function or configuration may unnecessarily obscure the subject matter of the present disclosure, the detailed description thereof will be omitted. In addition, terms to be described later are terms defined in consideration of functions in the exemplary embodiments of the present disclosure, which may vary according to the intention or custom of users or operators. Therefore, definitions of these terms should be made on the basis of the content throughout the present specification.

Figure 2:
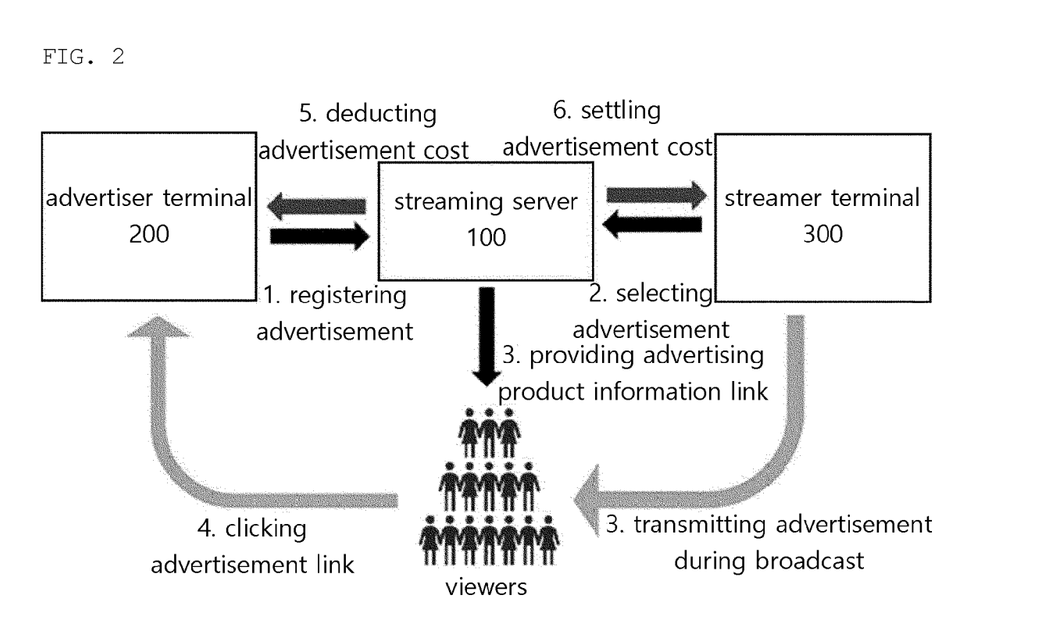
FIG. 2 is a view illustrating a configuration of a system of providing an advertisement through a streaming video according to an exemplary embodiment.

FIG. 2 is a view illustrating a configuration of a system of providing an advertisement through a streaming video according to the exemplary embodiment.

Referring to FIG. 2, the system of providing the advertisement through the streaming video according to the exemplary embodiment may be configured to include an advertiser terminal 200, a streaming server 100, and a streamer terminal 300. Here, at least one terminal may be implemented as a computer capable of connecting to a remote server or remote terminals through a network. Here, the computer may include, for example, a navigation device, a notebook computer, a desktop, a laptop, and the like, which are equipped with respective web browsers. Here, at least one terminal may be implemented as a terminal capable of connecting to the remote server or the remote terminals through the network. The at least one terminal, for example, may include, as wireless communication devices having guaranteed portability and mobility, a handheld-based wireless communication device of any kind, such as a navigation device, Personal Communication System (PCS), Global System of Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), Wireless Broadband Internet (WiBro) terminal, a smartphone, a smartpad, a tablet PC, etc.

The advertiser terminal 200 registers advertising content in an advertisement pool, and sets streamer conditions for a streamer who will advertise the registered advertising content. In the exemplary embodiment, the streamer conditions may include types of broadcast content, the number of followers, the number of connected users during real-time streaming, the number of viewers, and the like.

From a registered advertisement pool, the streamer terminal 300 selects advertising content desired to be advertised, generates streaming content, and transmits the streaming content to the streaming server 100. In the exemplary embodiment, the streamer may confirm advertising content, streamer conditions, and advertisement costs, which are registered in a system advertisement pool, and may select the advertising content, which is desired to be advertised through a streaming video.

The streaming server 100 matches advertising content and a streamer by comparing streamer conditions set by an advertiser for the advertising content and streamer information of the streamer who has selected an advertisement, and includes the advertising content matched with the streamer to a streaming video, so as to be output.

In addition, in the system of providing the advertisement through the streaming video according to the exemplary embodiment, when advertisers register advertisements, a streamer selects any one of the registered advertisements, and when the streamer activates an advertisement function, a real-time broadcast video of the streamer may be converted into an advertisement video of the advertisement selected by the streamer.

In the exemplary embodiment, the streamer may select any one of the advertisements registered by the advertisers, and provide advertising content to viewers by including an advertising content provision object such as an advertising product information link in the streaming video transmitted by the streamer.

In the exemplary embodiment, from an advertisement pool registered by advertisers, a streamer confirms advertising content and an advertisement unit price, and selects the advertising content desired to be advertised. Thereafter, the advertisement may be exposed on an integrated widget of a streamer broadcast, and the streamer may control advertisement playback through a control program during the broadcast.

In addition, in the exemplary embodiment, a streamer provides functions of advertising product purchase convenience such as favorites, wish lists, or the like on an advertising content provision object inserted into a video, and enables viewers to purchase an advertising product. In the exemplary embodiment, in a case where the number of purchases of the advertising product increases, an object may be displayed by enlarging a size of the object or by highlighting an outline of the object when the advertising content provision object is displayed on a streaming screen. In addition, in the exemplary embodiment, a highlight line thickness and a color of the advertising content provision object may be set to be more emphasized in proportion to the number of purchases of the product, sale amounts of the product, etc.

Figure 3:
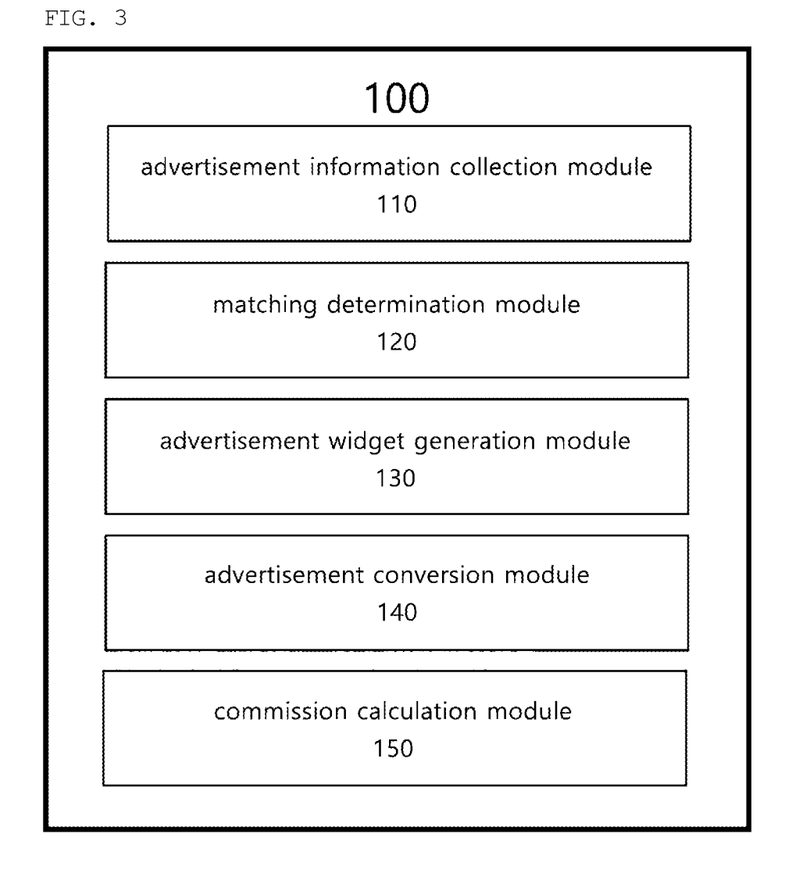
FIG. 3 is a view illustrating a data processing configuration of a streaming server according to the exemplary embodiment.

FIG. 3 is a view illustrating a data processing configuration of a streaming server according to the exemplary embodiment.

Referring to FIG. 3, the streaming server 100 according to the exemplary embodiment may be configured to include an advertisement information collection module 110, a matching determination module 120, an advertisement widget generation module 130, an advertisement conversion module 140, and a commission calculation module 150. The term "module" used in this specification should be interpreted as being able to include software, hardware, or a combination thereof, depending on the context in which the term is used. For example, the software may be a machine language, a firmware, an embedded code, and an application software. As another example, the hardware may be a circuit, a processor, a computer, an integrated circuit, an integrated circuit core, a sensor, a Micro-Electro-Mechanical System (MEMS), a passive device, or a combination thereof.

The advertisement information collection module 110 collects advertising content registered by an advertiser, streamer conditions set in the advertising content, and streamer information. In the exemplary embodiment, the streamer conditions set in the advertising content is information on qualification requirements of a streamer, desired by an advertiser, to conduct an advertisement, and the streamer conditions may include streamer's qualification requirement information and detailed item information, which may be linked to advertisement effects, such as broadcast content, the number of followers, and the number of viewers. In the exemplary embodiment, the advertiser sets the streamer conditions in the advertising content, so that a streamer who is unable to satisfy the corresponding conditions may be excluded from advertisement performance candidates, and may be restricted to access to the advertising content. In the exemplary embodiment, when registering advertising content, the advertiser registers a product to be advertised, composition of the advertising content, and advertisement cost information together.

The streamer information collected by the advertisement information collection module 110 according to the exemplary embodiment is detailed information included in the streamer conditions. For example, the advertisement information collection module 110 may collect information such as broadcast content, the number of followers, the number of viewers, advertisement performance history, advertisement costs, a streamer's gender and age, main viewers' gender and age, and the like for each streamer registered in a system.

The matching determination module 120 determines whether the streamer to proceed with the advertisement of the advertising content matches or not by comparing the streamer conditions set in the selected advertising content and the streamer information when the streamer selects the advertising content desired to be advertised according to the comparison result. For example, in a case where the streamer conditions set in the advertising content are such that the number of followers is 100,000 or more, the average number of viewers is 800 or more, streamers are in their twenties, the gender of main viewers is female, and the gender of streamers is male, the matching determination module 120 determines whether the streamer information of the streamer who has selected the advertising content satisfies all the conditions set in the advertising content. Specifically, when information of a streamer 1 who has selected corresponding advertising content is such that the number of followers is 120,000, the average number of viewers is 850, the age of the streamer is 26, the gender of the main viewers is female, and the gender of the streamer is male, the streamer 1 may access the advertising content. When information of a streamer 2 who has selected corresponding advertising content is such that the number of followers is 90,000, the average number of viewers is 950, the age of the streamer is 26, the gender of the main viewers is female, and the gender of the streamer is male, the streamer 2 is unable to access the advertising content.

In the exemplary embodiment, the matching determination module 120 selects a streamer that satisfies all the streamer conditions set in the advertising content by comparing the streamer conditions set in the advertising content and the streamer information, and calculates matching suitability of the selected streamer and the advertising content. In the exemplary embodiment, the matching suitability may be calculated according to the number of followers and a matching rate of the set streamer conditions and the streamer information. For example, when all the streamer conditions set in the advertising content are satisfied, the matching determination module 120 calculates a higher matching suitability for a streamer having a larger number of followers. That is, in the exemplary embodiment, the matching suitability proportional to a streamer influence index including the number of followers and the average number of viewers of the streamer may be calculated. For example, the matching suitability of streamers having the same streamer conditions including the number of followers may be calculated, so as to be proportional to the average number of viewers. In the exemplary embodiment, an advertisement streamer priority based on the matching suitability according to the comparison result of the streamer conditions and the streamer information may be generated and transmitted to an advertiser terminal. The advertiser terminal confirms information on the advertisement streamer priority, selects a streamer, and transmits the selected result to a streaming server. In addition, an advertisement contract with the selected streamer and an advertisement progress request message may be transmitted to the streaming server.

The advertisement widget generation module 130 generates an advertisement widget that is an advertising content provision object linked to an advertisement link output to a streaming video. In the exemplary embodiment, the advertisement link may include a product purchase link, a product detailed description link, a product advertisement video streaming link, and the like. In the exemplary embodiment, the advertisement widget generation module 130 adds a display effect of the advertisement widget when an advertising product linked to the generated advertisement widget is sold and the number of purchases of the advertising product increases. In a case where the number of purchases of the advertising product increases, the advertisement widget generation module 130 according to the exemplary embodiment may display an object by enlarging a size of the object or highlighting an outline of the object when the advertising content provision object is displayed on a streaming screen. In addition, in the exemplary embodiment, a highlight line thickness and a color of the advertising content provision object may be set to be more emphasized in proportion to the number of purchases of the product, sale amounts of the product, etc. In addition, in the exemplary embodiment, when a purchase event of a viewer occurs after the generated advertisement widget is output on the streaming screen, the occurrence of the purchase event may be notified to a viewer and a streamer by changing a display effect of the advertisement widget. For example, when the advertisement widget is output on the streaming screen and the advertising product is purchased, a visual effect in which a color of the widget is changed or glittered, or a visual object is switched may be generated.

In addition, the advertisement widget generation module 130 according to the exemplary embodiment may add visual and sound effects applied to an advertisement widget whenever a purchase event occurs in a case where an advertising product purchase event exceeding the number of set counts within a predetermined period of time occurs or each purchase event occurs continuously within a predetermined period of time. For example, the advertisement widget generation module 130 may set the advertisement widget in such a way that a size of the advertisement widget is increased by adjustment as the number of purchases of the advertising product increases, or a visual effect such as firecrackers is generated on the corresponding advertisement widget when the number of target purchases is achieved.

The advertisement conversion module 140 converts a real-time broadcast video of a streamer into an advertisement video of an advertisement selected by the streamer when an advertisement function is activated by a streamer terminal. In the exemplary embodiment, anytime during a broadcast, a streamer may convert a streaming video into the advertisement video through a streaming control program provided by a streaming server.

The commission calculation module 150 determines traffic due to accessing advertising content, the number of sales of advertising products sold through the advertising content, and the sales amount through an advertisement widget output to a streaming video, so as to determine advertisement performance obtained through a streamer, and calculate additional commission of an incentive concept according to the determined advertisement performance. In the exemplary embodiment, the calculated additional commission may be divided into and provided to the streamer and the streaming platform. In the exemplary embodiment, the commission calculation module 150 may determine the advertisement performance of the streamer through parameters including: the number of advertising products sold during a streaming video transmission time in which the advertisement widget is exposed; the number of advertising products sold for a predetermined period of time after completion of the advertisement through the streaming video; and subsequent revenues and sales growth figures after the completion of the advertisement through the streaming video. In the exemplary embodiment, the additional commission may be calculated through Equations 1 and 2.

Additional commission=previously paid advertising costs*(the number of actual advertising product purchases/the number of customers who connected to an advertisement link through an advertisement widget)      Equation 1

Additional commission=revenues during an advertisement time*α      Equation 2

(α is a ratio agreed in advance between a streamer and an advertiser)

In addition, in the exemplary embodiment, the commission calculation module 150 may determine the advertisement performance obtained through the streamer by classifying the number of advertising product sales and the number of advertising product exposures. In the exemplary embodiment, the commission calculation module 150 may determine the number of advertising product sales by measuring the number of occurrences of purchase events occurring before and after an advertising time and during the advertising time. Through the advertisement widget included in the streaming content, the number of advertising product exposures may be determined by counting the number of advertisement video views, the number of advertisement video playbacks, and the number of advertisement page accesses. In addition, the commission calculation module 150 may determine the number of advertising product exposures by counting the number of streaming broadcast viewers during an advertisement video output time.

The commission calculation module 150 according to the exemplary embodiment may calculate additional commission according to an advertisement performance index divided into the number of advertising product sales and the number of advertising product exposures. In the exemplary embodiment, an additional commission rate for the number of advertising product exposures may be set in advance, and according to the set additional commission rate, the additional commission in which the number of advertising product exposures is reflected may be calculated. In the exemplary embodiment, the number of advertising product exposures may be calculated by including the number of recommendations and the number of sharing of an advertisement link, which is linked to an advertisement widget.

In addition, in the exemplary embodiment, the commission calculation module 150 may calculate a reward to be provided to a sponsor who purchases an advertising product. In the exemplary embodiment, after an advertising product is purchased in a sponsor terminal, when advertising product review information including reviews and photos of the corresponding product is input into a chat window of a streaming broadcast, the reward may be provided to a sponsor terminal according to a result of confirming the adequacy of the uploaded advertising product review information. For example, when a purchase photo of the advertising product is uploaded from the sponsor terminal, the commission calculation module 150 confirms whether an object included in an image is an advertising product by means of an image detection process, or confirms a product code or the like included in the advertising product, and when a purchase photo of the advertising product is uploaded from the sponsor terminal, the commission calculation module 150 provides a preset reward to the sponsor terminal. In addition, when review information of the advertising product is input as text from the sponsor terminal, a reward is provided to the sponsor terminal according to a result of conducting detection of a text format and meaning thereof. In the exemplary embodiment, a text advertisement format may be preset through the sponsor terminal, and an advertisement reward may be provided to the sponsor terminal that transmits the text conforming to the preset advertisement format. In addition, in the exemplary embodiment, when another sponsor uses a referral code to purchase an advertising product, a reward may be provided to a sponsor terminal providing the referral code by inputting the referral code as a message in a chat window after the advertising product is purchased in the sponsor terminal.

In addition, in the exemplary embodiment, after advertisement progress through a streaming video is completed, the matching determination module 120 updates matching suitability of a streamer and advertising content according to advertisement performance and additional commission of the streamer. In the exemplary embodiment, streamer's advertisement performance and additional commission history are stored for each streamer, and a performance index of a concept having an additional point that improves matching suitability is calculated according to the streamer's advertisement performance and additional commission, and the streamer's performance index is automatically added to the matching suitability when the advertising content matching suitability is calculated.

Hereinafter, a method of providing an advertisement through a streaming video will be described in sequence. Since operations (i.e., functions) of the method of providing the advertisement through the streaming video according to the exemplary embodiment is essentially the same as the functions of the system of providing an advertisement through a streaming video, the description overlapping with FIGS. 2 to 3 will be omitted.

Figure 4:
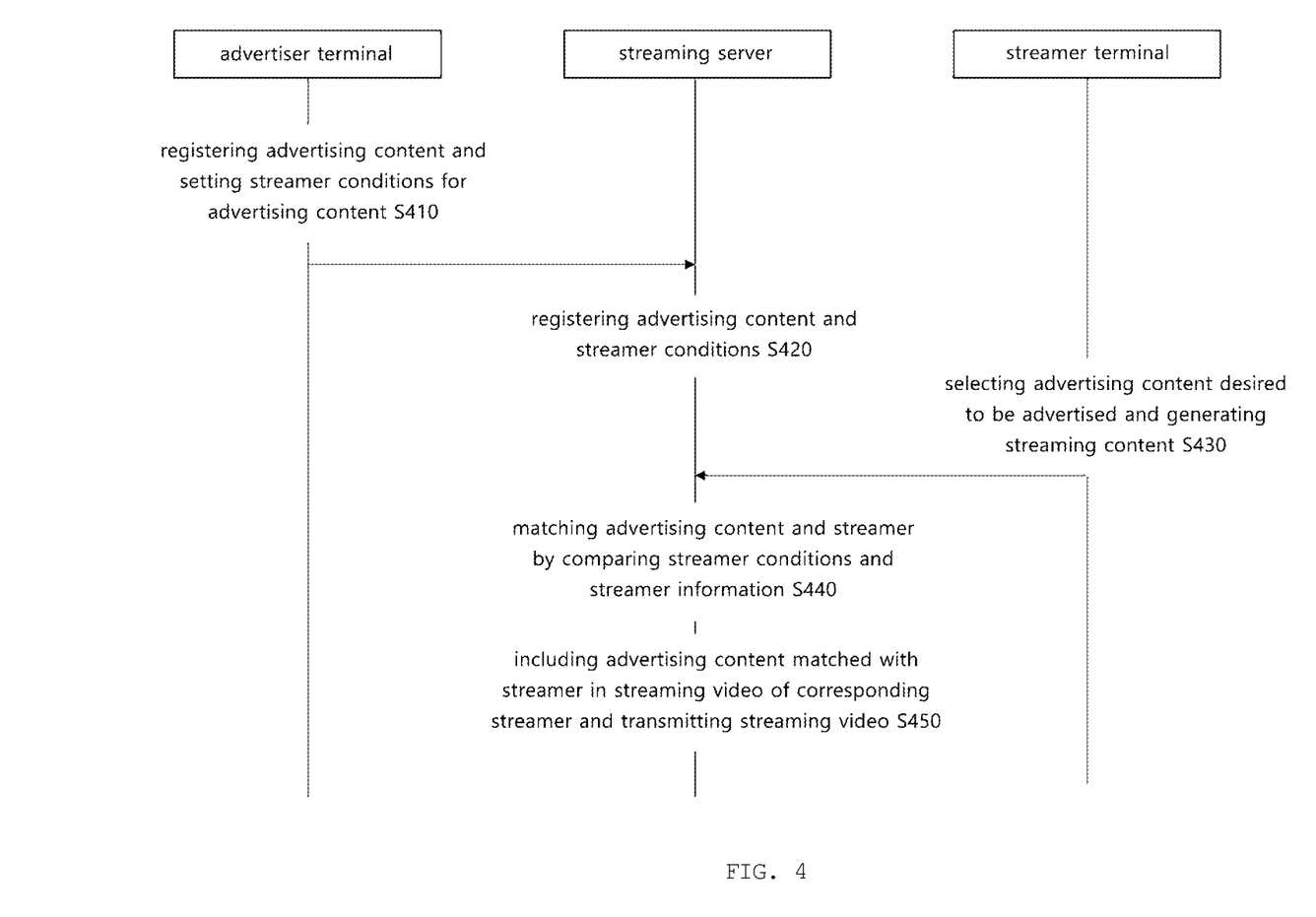
FIG. 4 is a signal flow diagram of the system of providing the advertisement through the streaming video according to the exemplary embodiment.

FIG. 4 is a signal flow diagram of the system of providing the advertisement through the streaming video according to the exemplary embodiment.

Referring to FIG. 4, in step S410, an advertiser terminal registers advertising content in an advertisement pool, sets streamer conditions for a streamer to advertise the advertising content, and transmits the advertising content and streamer conditions to a streaming server.

In step S420, the streaming server registers the advertising content and the streamer conditions.

In step S430, a streamer terminal selects advertising content desired to be advertised from the registered advertisement pool, and generates and transmits streaming content to the streaming server.

In step S440, the streaming server matches the advertising content with the streamer by comparing the set streamer conditions and the streamer information of the streamer who has selected the advertisement. In step S450, the advertising content matched with the streamer is included in a streaming video of the corresponding streamer, so as to be output. In step S450, traffic due to accessing the advertising content through an advertisement widget output to a broadcast video, the number of sales and sales amount of the advertising product sold through the advertising content may be determined, so that advertisement performance obtained through the streamer matched with the advertising content is determined and additional commission according to the determined advertisement performance may be calculated. In addition, after the advertisement progress through the streaming video is completed, the matching suitability of the streamer and advertising content may be updated according to the advertisement performance and the additional commission of the streamer.

Figure 5:
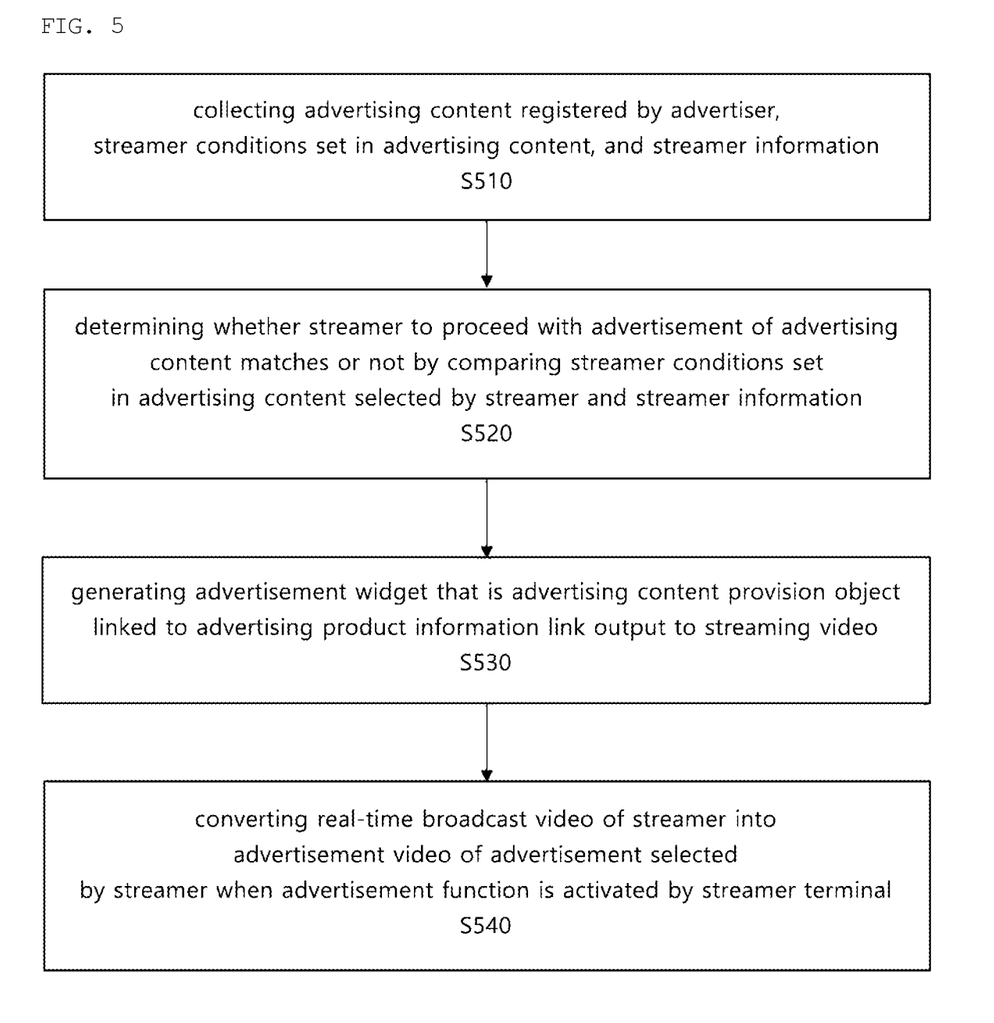
FIG. 5 is a view illustrating a data processing flow of the streaming server according to the exemplary embodiment.

FIG. 5 is a view illustrating a data processing flow of the streaming server according to the exemplary embodiment.

Referring to FIG. 5, in step S510, advertising content registered by advertisers, streamer conditions set in the advertising content, and streamer information are collected.

In step S520, when the streamer selects the advertising content desired to be advertised, the streamer conditions set in the selected advertising content and the streamer information are compared with each other, so that whether the streamer to proceed with an advertisement of the advertising content matches or not is determined.

In step S530, an advertisement widget that is an advertising content provision object linked to an advertisement product information link output to a streaming video is generated. In the exemplary embodiment, a display effect of the advertisement widget may be added when an advertising product linked to the widget through the generated advertisement widget is sold and the number of purchases of the advertising product increases. For example, in a case where the number of purchases of the advertising product increases, an object may be displayed by enlarging a size of the object or highlighting an outline of the object when an advertising content provision object is displayed on a streaming screen. In addition, in the exemplary embodiment, a highlight line thickness and a color of the advertising content provision object may be set to be more emphasized in proportion to the number of purchases of the product, sale amounts of the product, etc.

In step S540, when an advertisement function is activated by a streamer terminal, a streamer's real-time broadcast video is converted into an advertisement video of the advertisement selected by the streamer.

Through the system and method of providing the advertisement through the streaming video as described above, the streamer may generate profits through the advertisement by selecting the advertising content he or she desires to advertise, and the advertiser may provide the advertising content through the streamer suitable for the advertising content, whereby the advertisement effects may be improved.

In addition, the streamer may select any one of the advertisements registered by the advertisers, so as to proceed with the advertisement, thereby creating effects that advertisement profits may be earned, advertisement concentration may be improved in a forced advertising form during the broadcast, and by using the method of voluntary advertisement selection and playback, the broadcast may not be interfered with by the advertisement.

In addition, an additional advertising cost is calculated according to the advertisement performance of the streamer, whereby the profits of the streamer may be increased and the advertisement effects may be maximally increased.

The disclosed subject matter is only an example, and without departing from the gist of the claims claimed in the claims, various modifications may be made by those skilled in the art, so the scope of protection of the disclosed subject matter is not limited to the specific exemplary embodiment described above in detail.

What is claimed is:

1. A system of providing an advertisement through a streaming video, the system comprising:
   an advertiser terminal configured to register advertising content in an advertisement pool, and set streamer conditions for a streamer to advertise the advertising content;
   a streamer terminal configured to select the advertising content desired to be advertised from the registered advertisement pool, generate streaming content, and transmit the streaming content to a streaming server; and
   the streaming server configured to match the advertising content with the streamer by comparing the set streamer conditions and streamer information on the streamer who has selected the advertisement, and include the advertising content matched with the streamer in a streamer's broadcast video, so as to be output,
   wherein the streaming server comprises:
   an advertisement information collection module configured to collect the advertising content registered by an advertiser, the streamer conditions set in the advertising content, and the streamer information;
   a matching determination module configured to determine whether the streamer to proceed with the advertisement of the advertising content matches or not by comparing the streamer conditions set in the selected advertising content and the streamer information when the streamer selects the advertising content desired to be advertised;
   an advertisement widget generation module configured to generate an advertisement widget that is an advertising content provision object linked to an advertising product information link output to the streaming video; and
   an advertisement conversion module configured to convert the real-time broadcast video of the streamer into an advertisement video of the advertisement selected by the streamer when an advertisement function is activated by the streamer terminal,
   wherein the streaming server further comprises:
   a commission calculation module configured to determine traffic due to accessing the advertising content through the advertisement widget output to the broadcast video, the number of sales and sales amount of the advertising product sold through the advertising content, so that advertisement performance obtained through the streamer matched with the advertising content is determined and additional commission according to the determined advertisement performance is calculated,
   wherein the streamer conditions include broadcast content, the number of followers, and the number of viewers as streamer's qualification requirement information,
   wherein the matching determination module calculates a matching suitability based on a number of followers, a streamer influence index, and the average number of viewers of the streamer, and an advertisement streamer priority based on the matching suitability according to the comparison result of the streamer conditions and the streamer information is generated,
   wherein the commission calculation module calculates a reward to be provided to a sponsor who purchases an advertising product, and
   wherein, after an advertising product is purchased in a sponsor terminal, when advertising product review information including reviews and photos of the corresponding product is input into a chat window of a streaming broadcast, the reward is provided to a sponsor terminal according to a result of confirming the adequacy of uploaded advertising product review information.

2. The system of claim 1, wherein the advertisement widget generation module adds a display effect of the advertisement widget when an advertising product linked to the generated advertisement widget is sold and the number of purchases of the advertising product increases.

3. The system of claim 1, wherein after an advertisement progress through the streaming video is completed, the matching determination module updates matching suitability of the streamer and the advertising content according to the advertisement performance and the additional commission of the streamer.

* * * * *